(12) United States Patent
Patzlsperger et al.

(10) Patent No.: US 12,528,585 B2
(45) Date of Patent: Jan. 20, 2026

(54) SIDE GUIDE AND CARGO DECK OF AN AIRCRAFT

(71) Applicant: TELAIR INTERNATIONAL GMBH, Miesbach (DE)

(72) Inventors: Andreas Patzlsperger, Waakirchen (DE); Jakob Riedl, Irschenberg (DE); Christoph Barauke, Hausham (DE)

(73) Assignee: TELAIR INTERNATIONAL GMBH, Miesbach (DE)

( * ) Notice: Subject to any disclaimer, the term of this patent is extended or adjusted under 35 U.S.C. 154(b) by 781 days.

(21) Appl. No.: 17/736,805

(22) Filed: May 4, 2022

(65) Prior Publication Data
US 2022/0355933 A1    Nov. 10, 2022

(30) Foreign Application Priority Data

May 5, 2021  (DE) .......................... 102021111705.4

(51) Int. Cl.
  *B64D 9/00*   (2006.01)
  *B64C 1/20*   (2006.01)
(52) U.S. Cl.
  CPC ............... *B64D 9/003* (2013.01); *B64C 1/20* (2013.01)
(58) Field of Classification Search
  CPC .... B64D 9/003; B64D 9/00; B64D 2009/006; B64C 1/20
  USPC ...................................... 410/104, 77, 80, 94
  See application file for complete search history.

(56) References Cited

U.S. PATENT DOCUMENTS

| | | | |
|---|---|---|---|
| 6,002,350 A | 12/1999 | Checa et al. | |
| 8,496,418 B2 | 7/2013 | Huber et al. | |
| 9,540,106 B2 | 1/2017 | Huber et al. | |
| 2012/0037753 A1 | 2/2012 | Huber et al. | |
| 2019/0161191 A1* | 5/2019 | Köhler | B64C 1/20 |

(Continued)

FOREIGN PATENT DOCUMENTS

| | | |
|---|---|---|
| DE | 102010036983 | 2/2012 |
| DE | 102019124312 | 3/2021 |

(Continued)

OTHER PUBLICATIONS

Extended European Search Report issued in EP24191569.3 (Aug. 23, 2024).

(Continued)

*Primary Examiner* — Amy R Weisberg
*Assistant Examiner* — Philip Charles Adams
(74) *Attorney, Agent, or Firm* — Barnes & Thornburg LLP (57) ABSTRACT

A side guide for guiding and/or fastening pieces of cargo, in particular containers and/or pallets, in an aircraft. The side guide has at least one side guide device and at least one holding unit. The holding unit comprises a fastening frame extending in a longitudinal direction and at least one securing device arranged on the fastening frame, which has a plurality of recesses extending transversely to the longitudinal direction. The side guide device is insertable at different positions into at least one of the recesses and can be secured in the inserted state at the different positions by the securing device. The side guide device has at least one contact element, which, in the inserted state, can be engaged with at least one fixing element, displaceable in the longitudinal direction of the securing device.

17 Claims, 6 Drawing Sheets

(56) References Cited

U.S. PATENT DOCUMENTS

2019/0276148 A1    9/2019  Huber et al.
2019/0291626 A1    9/2019  Duffy et al.

FOREIGN PATENT DOCUMENTS

EP          2399826        12/2011
WO    WO 2010/149179      12/2010

OTHER PUBLICATIONS

Extended European Search Report issued in EP24191886.1 (Aug. 23, 2024).
Extended European Search Report issued in EP24192078.4 (Aug. 23, 2024).
Office Action from corresponding EP patent application No. 24191569.3 (Oct. 21, 2025).

* cited by examiner

Fig. 4
(Section A-A)

Fig. 5
(Section C-C)

Fig. 6
(Section D-D)

Fig. 7

Fig. 8
(Section B-B)

SIDE GUIDE AND CARGO DECK OF AN AIRCRAFT

CROSS REFERENCE TO RELATED APPLICATIONS

This application claims priority to German Patent Application No. 10 2021 111 705.4, filed on May 5, 2021. The disclosures set forth in the referenced application is incorporated herein by reference in its entirety.

FIELD OF THE DISCLOSURE

The invention relates to a side guide and a cargo deck of an aircraft. A side guide is known, for example, from DE 10 2019 124 312 A1.

BACKGROUND

It is known that cargo spaces of aircraft are frequently refitted for different intended uses. For example, it can be necessary to configure a cargo deck in dependence on the pieces of cargo to be loaded. Pieces of cargo, for example, containers or pallets, having standardized dimensions are often used when transporting cargo in aircraft. Thus, there are the following standard sizes for containers, for example, for civil aviation: 123.5 cm by 317.5 cm (88 inches×125 inches), 143.8 cm by 317.5 cm (96 inches×125 inches), 223.5 cm by 157.5 cm (88 inches×62 inches). In the military realm, pallets having dimensions of 274.3 cm by 223.5 cm (108 inches×88 inches) are often used. Furthermore, containers are used in the military realm which differ from typical standards and have holding rings on the corners, so that they can be lifted using a crane, for example. Such containers are referred to as ISU containers. They have essentially the following bottom dimensions: 274.3 cm by 223.5 cm (108 inches×88 inches). Their height is approximately 232 cm (91.35 inches).

Side guides installed on the cargo deck are used for fixing and guiding such standardized and non-standardized pieces of cargo.

For optimum utilization of a cargo space, it is necessary to offer a variety of possible configurations, wherein rapid refitting of the cargo deck has a high priority. Suitable side guides therefore have to be attachable and reconfigurable quickly and easily, since the costs for operating corresponding aircraft are very high. Furthermore, the configuration or refitting is to be able to be carried out very easily, since the personnel who carry out this reconfiguration often have received no or only poor training for the cargo deck used. In addition, the equipment of the cargo deck, in particular the side guides have to be very robust, since they are subjected to very high loads and careful treatment cannot be demanded due to the high time pressure during loading and unloading. A cargo deck having corresponding side guides is often subjected to wetness, high temperature differences, dust, and other rough influences. A defective cargo deck, even a defective functional element of the cargo deck, can have the result that the corresponding aircraft is unusable for several days. Such a failure is very expensive.

Side guides are known from DE 10 2019 124 312 A1, which enable a cargo deck to be reconfigured quickly and easily, so that different pieces of cargo having different dimensions can be loaded. One disadvantage in the side guide described in DE 10 2019 124 312 A1 is the nature of the connection between the longitudinally displaceable fixing element and the side guide rail, in which a cylindrical section of the fixing element engages in a cylindrical opening of an insert plate of the side guide rail for fixing. A small cylindrical section adjoins the cylindrical section of the fixing element to release the side guide rail. With high vertical forces, due to the angle relationships in the transition between the cylindrical sections of different diameters, this results in a wedge effect and thus the bending up of the insert plate. If high vertical forces occur, the insert plate and thus the side guide rail can detach from the fixing element. Secure fixing therefore cannot be ensured.

Furthermore, in the side guides according to DE 10 2019 124 312 A1, tension or compression forces acting transversely on the side guide rail are transmitted indirectly, i.e., via the screw connections of the insert plates, from the rail to the fastening frame. In particular horizontal forces, which act in the y direction toward the aircraft center or away from it, always lead via the screw connections between the insert plates and the side guide rail. High bending strains thus occur in the insert plates. Furthermore, the screw connections between the insert plates and the side guide rail can fail at such high forces.

SUMMARY

The invention is based on the object of specifying a side guide which enables a variety of different configurations, is robust, and has increased operational safety. Furthermore, the invention is based on the object of specifying a cargo deck of an aircraft.

This object is achieved with regard to the side guide in accordance with the present disclosure. The above-mentioned object is achieved with respect to the cargo deck in accordance with the present disclosure.

Specifically, the object is achieved by a side guide for guiding and/or fastening pieces of cargo, in particular containers and/or pallets, in an aircraft, which has at least one side guide device and at least one holding unit for the side guide device. The holding unit comprises a fastening frame extending in a longitudinal direction and at least one securing device arranged on the fastening frame, which securing device has a plurality of recesses extending transversely to the longitudinal direction. The side guide device is insertable at different positions in at least one of the recesses in each case and can be secured in the inserted state at the different positions by the securing device.

The side guide device has at least one contact element, which in the inserted state can be engaged or is engaged with at least one fixing element, displaceable in the longitudinal direction, of the securing device. The at least one contact element has at least one inside support section for the securing device for introducing occurring forces. Additionally or alternatively, the contact element has at least one formfitting section having at least one opening having a cross-sectional contour deviating from a circular shape for the engagement of the fixing element.

Side guides in aircraft are typically used for the purpose of guiding pieces of cargo in the longitudinal direction (X axis) of the aircraft (from bow to stern, or from stern to bow). During the flight, they absorb forces transversely to the longitudinal direction (Y axis) and hold the pieces of cargo in their position. The guide rollers engage from below on the pieces of cargo and support them. They enable simple transport of the pieces of cargo, which is subjected to little friction, within the cargo space.

The invention has various advantages. The contact element forms a central element, which fulfills critical functions with the inside support section and the formfitting section. The inside support section is used to transmit occurring transverse forces in the transverse direction (y direction) of the aircraft on the side guide device to the securing device, which is connected to the fastening frame. In case of load, the transverse forces are introduced via the inside support section into the securing device, which in turn passes on the introduced forces to the fastening frame, which is preferably fastened on the aircraft structure. Preferably, the transmission of the transverse forces from the inside support section of the contact element to the securing device takes place directly, i.e., without intermediate element. An indirect force transmission is alternatively possible, however.

Due to the arrangement or the formation of the support section on the inside of the contact element, the transverse forces are preferably always transmitted, independently of whether they are tension forces and/or compression forces, as pressure from the contact element to the securing device. The support section is not only used to transmit the transverse forces as pressure to the securing device, but rather in addition to absorb the transverse forces as pressure. In other words, the support section is designed to absorb the transverse forces (tension and/or compression forces) engaging on the side guide device, in particular on the side guide rail, as pressure and to transmit them as pressure to the securing device. The force flow of the absorbed transverse forces is thus prevented from being guided via fasteners for fastening the contact element on, for example, a side guide rail of the side guide device, since the force transmission takes place via one or more component contacts as pressure. A failure of the fasteners due to transverse forces is thus prevented, so that the operational safety of the side guide is increased. Furthermore, if the side guide is used in a cargo space, pieces of cargo having increased weight are transported or secured.

In the scope of the invention, the inside support section is to be understood to mean that the support section is formed on an inside of the contact element, which is arranged integrated at least in sections in an interior of the side guide device, in particular in a side guide rail.

The inside support section can be formed flat. Additionally or alternatively, the inside support section can be formed stepped. Other shapes of the inside support section are possible.

One critical concept of the present invention is that the side guide device, which assumes the actual guiding and holding function of the side guide with respect to the pieces of cargo, is mounted displaceably in a fastening frame. The side guide device can thus assume different positions, preferably in the transverse direction of the aircraft (y axis), to hold and guide pieces of cargo having different dimensions, also standardized pieces of cargo as described in the introduction. Numerous side guide devices, which have to be arranged at different positions within the cargo deck, can thus be saved. The positions can be selected so that pieces of cargo having predefined standard dimensions can be guided.

The recesses can be slots, for example, which are open upward. The recesses insofar enable a form fit with the insertable side guide device, so that forces can be dissipated efficiently.

The formfitting section is part of the contact element and comprises an opening, in which the fixing element engages to secure the side guide device in the inserted state. In other words, the side guide device is held in the z direction by the form fit between the fixing element and the formfitting section. The opening has a cross-sectional contour deviating from a circular shape. In other words, the opening has a shape deviating from a cylindrical shape. The opening therefore does not correspond to a circular drilled hole.

The advantage results from the opening shape according to the invention in that in the event of strain of the side guide device, in particular of the side guide rail, by torsion around its longitudinal axis, no increased wedge effect due to the wedging of the contact element and the fixing element on the opening results. The opening shape according to the invention enables a stable and fixed connection to the fixing element, so that impermissible bending forces, in particular in the region of a transition to an adjoining release contour of the fixing element, are prevented. The operational safety of the side guide is thus further increased, since loosening of the formfitting connection between the fixing element and the formfitting section is suppressed due to the opening shape. Furthermore, pieces of cargo having increased weight are transported or secured upon the use of the side guide in a cargo space.

To fix the side guide device on the frame, the fixing element can perform a rotational and/or translational movement. An actuating lever is preferably provided for this purpose on the fixing element. In one embodiment, the actuating lever and/or the frame have/has a link, so that the fixing element is displaced in the longitudinal direction of the side guide by the actuation of the actuating lever. The fixing element is preferably formed by a shaft having a longitudinal axis.

It is possible to form the side guide device partially as a U-rail profile or as a closed polygonal profile having recesses in sections for multiple contact elements. In one embodiment, the side guide device has latches. These can be conventional standardized latches, which engage around edge regions of cargo pallets and/or free containers using their latch lugs, inter alia, to fix them in the Z direction of the aircraft. Alternatively or additionally, latches can be provided which engage in corresponding recesses of cargo pallets and/or cargo containers and secure them in the X direction and/or Z direction of the aircraft. Corresponding recesses are often provided in military pallets. Corresponding latches for such military pallets are referred to hereinafter as "side locks". The side guide device can thus have one or more such latches, wherein the side guide device extends over multiple holding units in one embodiment. If the side guide device extends over multiple side guides, there is sufficient space to arrange multiple latches on or at it.

It is possible to design the side guide according to the invention in such a way that the fastening frame of the side guide extends obliquely to the transverse direction of the aircraft. For example, the longitudinal direction of the fastening frame can extend at a 45° angle to the transverse direction of the aircraft. However, the fastening frame preferably extends in parallel to the transverse direction (Y axis) of the aircraft.

The side guide device can be secured by the securing/fixing device at at least two different positions on the fastening frame. However, the side guide device may preferably be secured at a plurality of positions, so that it can interact with the pieces of cargo in different configurations of the cargo deck.

In one particularly preferred embodiment, the fixing element has at least one fixing contour, with which the fixing element, in a fixing position, engages in a formfitting manner in the cross-sectional contour of the opening for securing the side guide device. In this case, the side guide device is in the inserted state, i.e., it is inserted into at least one of the recesses. The fixing contour can be formed complementary to the cross-sectional contour of the opening. In other words, the fixing contour can be a positive shape in relation to the cross-sectional contour of the opening as a negative shape. In the fixing position, the fixing contour is engaged with the cross-sectional contour. In this case, the fixing contour can abut against the cross-sectional contour so it is displaceable in the longitudinal direction of the fastening frame. Due to the formfitting connection between the fixing contour and the cross-sectional contour, the side guide device is firmly secured at the corresponding inserted position.

The fixing contour of the fixing element and/or the cross-sectional contour of the opening preferably have at least one at least partially circular contour section and at least one linear contour section. In other words, the fixing contour and/or the cross-sectional contour are/is formed by at least one circular and one linear contour section. The fixing contour and/or the cross-sectional contour preferably have/has multiple linear contour sections. The linear contour sections are preferably formed by flattenings. The flattenings are preferably produced by milling.

The fixing contour and/or the cross-sectional contour are/is particularly preferably formed mushroom-shaped. The cross-sectional contour of the opening is preferably formed upright in relation to the longitudinal direction of the fastening frame. This also applies to the fixing contour of the fixing element at least in the fixing position. In this embodiment, a particularly stable formfitting connection is provided, by which loosening of the contact element and thus of the side guide device from the fixing element is prevented.

Furthermore, the fixing element preferably has at least one release contour having at least one flattening, which adjoins the fixing contour in the longitudinal direction and is formed in such a way that the side guide device is insertable into at least one of the recesses or removable therefrom in a release position of the fixing element. The release contour preferably comprises at least two opposing flattenings on a longitudinal axis. The fixing contour and the release contour preferably each have a flattening which each continuously merge into one another in an adjoining manner. Particularly preferably, the respective adjacent flattenings are in alignment with each other. By way of the flattened release contour adjoining the fixing contour, a transition is provided between the contours, which has an increased residual cross section in comparison to a transition between two cylindrical contours. The rigidity of the fixing element is thus increased in particular in the transition and a wedging effect on the opening cross section of the contact element is thus reduced or prevented.

The contact element is preferably formed by a plate-shaped reinforcing insert, in particular a steel insert plate, which is firmly connected to a rail element of the side guide device. The rail element preferably has a circumferentially closed profile, in particular a polygonal profile, which has a recess, in particular a milled opening, at at least one position for the contact element. In the event of high transverse forces which engage on the side guide device, it is necessary to reinforce the contact point between the side guide device and the holding unit, specifically the securing device. This is achieved here by the reinforcing insert, which is preferably firmly connected to the side guide rail of the side guide device, in particular by at least one screw connection.

In one particularly preferred embodiment, the securing device engages with at least one first housing region in the inserted state in a rail element, in particular the side guide rail, of the side guide device. The first housing region comprises in the longitudinal direction at least one stop for the support section of the contact element to absorb occurring forces from the rail element. In other words, the stop of the first housing part and at least a first part of the support section are in contact in case of load. If transverse forces occur, they are preferably transmitted directly from the support section to the stop. It is advantageous here that the force transmission always takes place as pressure and thus any possible fasteners of the contact element are protected.

The recesses are preferably provided on the securing device in such a way that the side guide device can be secured in at least two opposing recesses on the first housing region.

In a further preferred embodiment, the securing (fixing) device has at least one second housing region, which is spaced apart from the contact element in the inserted state of the side guide device and with the first housing region delimits at least one of the recesses at at least one of the different positions. In other words, a first housing region and an opposing second housing region each delimit one of the recesses in the longitudinal direction of the fastening frame. Or in other words, the two housing regions are spaced apart from one another in the longitudinal direction so that one of the recesses is located in between and thus forms a gap. It is ensured by the distance between the second housing region and the contact element that in case of load, transverse forces are always transmitted via the inside support section to the first housing region. This is critical so that the force flow of the transverse forces is not conducted via the fasteners of the contact element, but rather via the inside support section.

In one preferred embodiment, the support section comprises at least one step, with which a rail element, in particular the side guide rail, of the side guide device is in contact to transmit the occurring forces, in particular tension and compression forces, in the longitudinal direction of the fastening frame to the securing device. The step forms the second part of the support section. The step preferably faces toward a leg of the rail element. In other words, the step is formed on the side of the contact element facing away from the stop of the first housing region of the securing device. The step forms a seat for the rail element, with which the rail element is in contact. This can be a direct or indirect contact. The rail element supports itself on the contact element via the step, so that in case of load, transverse forces (in the y direction) are deliberately absorbed.

The support section preferably has at least one inside contact surface, which faces toward the first housing part for contact. The contact surface faces toward the stop of the first housing region in the inserted state of the side guide device. In case of load by occurring transverse forces, the inside contact surface of the support section is in contact, preferably direct contact, with the first housing section. The stop and the contact surface can alternatively be indirectly in contact. In case of transverse forces, a planar contact to the stop of the first housing region is possible via the planar contact surface, due to which the forces are introduced in an optimized manner into the securing device.

The securing device is preferably arranged displaceably in the fastening frame in the longitudinal direction. In other words, the securing device is arranged movably, in particular in a floating manner, in the longitudinal direction. In this embodiment, a carriage, which comprises the housing regions, and the fixing element mounted therein are displaceable jointly in the longitudinal direction. The securing device is preferably arranged guided in the fastening frame, so that an offset in the longitudinal direction is implementable. This has the advantage that fuselage deformations induced by flight operation and the offset of the side guide in the y direction linked thereto, in particular in the region of the center wing box of the aircraft, are prevented from crushing the containers and/or pallets. The side guide device compensates offsets due to the displaceable securing device in the y direction of the aircraft.

The side guide particularly preferably comprises at least one spring element, which is arranged supported on the fastening frame and spring mounts the securing device in the longitudinal direction. The side guide preferably has at least two spring elements, which support the securing device by springs in the longitudinal direction. The spring element is preferably arranged in a fork shape.

In flight operation, so-called "wing pinching" load cases often occur, in which the wings of the aircraft are deformed upward due to high wind loads and the aircraft structure of the cargo deck is thus deformed in the y direction toward the aircraft center. In this case, side guides for pallets and containers located in the cargo space move inward and reduce the total track width for the pallets and containers. This can have the result that lateral crushing occurs on the containers and pallets, so that impermissibly high forces act on the aircraft structure.

Due to the spring mounting of the securing device and thus the side guide device, such additional loads of the aircraft structure due to elevated transverse forces are prevented or at least reduced. It is possible, if side guides are arranged in the cargo space, in which different positions are necessary in the y direction, to make the side guide device springy at multiple positions.

In one embodiment, the side guide has at least one latch having a two-part latch claw at least in sections, which is fastened on the fastening frame in such a way that the two-part latch claw is pivotable from an upright working position into a lowered resting position. The latch claw can comprise a stop, which is pivotable with the latch claw from an upright working position into a lowered resting position. The latch claw can be lowered so that pieces of cargo, in particular containers and/or pallets, can be moved over it. Further configurations of the cargo deck may thus be ensured, in which the latch assumes the function of guiding and/or holding the pieces of cargo. Due to the ability to fold down the bolt, a configuration of the cargo deck can be provided which does not assume any guiding in addition to the side guide device and can be driven on by a vehicle, for example.

The latch can be fastened so it is rotationally movable on the fastening frame around a pivot axis, wherein the pivot axis is arranged in such a way that forces occurring when holding of pieces of cargo are conducted directly into the fastening frame. The pivot axis thus acts as a pivot joint and simultaneously introduces the occurring forces efficiently into the fastening frame in the working position.

The latch claw of the latch can have inclined surfaces on at least one side in order to move it from the working position into the resting position when a piece of cargo moves over it in a direction which is not the same as a holding direction of the latch claw.

Installation space is saved by the two-part latch claw, so that an installation combined with a fixing element is possible. Furthermore, so-called "B code military" pallets can be held by the two-part design of the latch claw. These pallets have pallet edges interrupted in sections having approximately 7 cm (2.75 inch) wide recesses. Securing or holding of the pieces of cargo is achieved independently of the final transport position of the pallets by the forked latch claw. Improved applicability of the side guide for "B code military" pallets is thus implemented.

In one preferred embodiment, the latch is fastened on the fastening frame in such a way that the latch claw of the latch is pivotable from a working position into a retracted parked position. In the parked position, the latch claw is tilted in the direction facing away from a longitudinal end of the fastening frame. In the parked position, the latch claw is fixed in place. For this purpose, at least one displaceable jaw part can be arranged on or in the fastening frame, which fixes the latch claw. In the parked position of the latch claw, space is provided thereby in such a way that the side guide device or the rail element is securable at an upstream position. The collision of the latch claw with the side guide device during placement is thus prevented.

The fixing element can have a region flattened in the longitudinal direction for accommodating a bridge element of the two-part latch claw extending transversely to the longitudinal direction. The bridge element preferably extends transversely to the longitudinal direction of the fastening frame and connects the two claw extensions of the latch claw. In this embodiment, it is advantageous that upon moving over or in generally upon folding down of the latch claw, the bridge element is accommodated by the region exposed by the flattening. A space-saving or compact structural form is thus implemented.

The securing device preferably has at least two of the recesses at a longitudinal end of the fastening frame, wherein the latch having the two-part latch claw adjoins on the inside. In other words, the two-part latch claw is offset inward from the longitudinal end along the fastening frame in such a way that in the region of the longitudinal end, one of the different positions is provided for the side guide device. The configuration options of a cargo deck are thus further increased.

The securing device can comprise at least three, in particular at least four, pairs of the recesses, so that the side guide device is securable at at least three, in particular four, different positions. It is possible that the securing device has at least five pairs of the recesses, so that the side guide device is securable at five different positions. In general, the side guide in this embodiment enables a variety of different configurations, in particular of the cargo deck.

In one embodiment, at least one guide roller is mounted so it is rotationally movable in a roller housing, which is insertable or inserted in at least one of the recesses at a time at different positions. The transport of the pieces of cargo is thus facilitated. Modern cargo decks are equipped so densely with functional elements (for example, side guides, guide rollers, latch claws, PDUs) that it is often difficult to find the correct space for the required functional elements on the cargo deck. Due to the deliberate saving of guide rollers and arrangement of guide rollers on side guides, space is saved in the cargo deck.

According to a concurrent aspect, the invention relates to a cargo deck of an aircraft having at least one side guide of the above-mentioned type, wherein the side guide has a plurality of holding units on which the side guide device is secured or securable.

Reference is made to the advantages explained in conjunction with the side guide device with respect to the advantages of the cargo deck. In addition, the cargo deck can alternatively or additionally have individual features or a combination of multiple features mentioned above with reference to the side guide.

BRIEF DESCRIPTION OF THE DRAWINGS

The invention is explained in more detail hereinafter with further characteristics with reference to the attached drawings. The illustrated embodiments represent examples of how the side guide according to the invention can be designed.

In the figures.

In the following description, the same reference signs are used for identical and identically acting parts.

DETAILED DESCRIPTION

A Cartesian coordinate system is typically used to provide individual direction specifications within an aircraft. The X axis extends from the bow to the stern in this case, the Y axis extends transversely to the X axis and lies essentially in the plane spanned by the wings. The Z axis is perpendicular to the X and Y axes.

FIGS. 1 to 8 show a side guide 10 according to one preferred exemplary embodiment according to the invention, wherein the side guide 10 has a side guide device 11 and a holding unit 12 for the side guide device 11. The side guide 10 is used for guiding and holding or fixing pieces of cargo in a cargo deck of an aircraft. Containers and pallets or the like are used as pieces of cargo.

The side guide device 11 can be secured on the holding unit 12 at different positions A, B, C, D. This has the advantage that the side guide device 11, which assumes the actual guiding and holding function with respect to the pieces of cargo, is displaceable along the holding unit 12 and is thus adaptable to the different track widths of the containers or pallets upon use in a cargo deck of an aircraft.

The holding unit 12 comprises a fastening frame 13, which has a longitudinal extension. In other words, the fastening frame 13 extends in a longitudinal direction v. The fastening frame 13 will be discussed in more detail hereinafter.

Furthermore, the holding unit 12 has a securing device 14, which is arranged displaceably in the longitudinal direction v on the fastening frame 13. Specifically, the securing device 14 is arranged displaceably in and against the longitudinal direction v. The securing device 14 has a housing 30 extending along the longitudinal direction v. The housing 30 comprises a longitudinal axis L, which extends in parallel to the longitudinal direction v of the fastening frame 13. The housing 30 is arranged displaceably in the longitudinal direction v on the fastening frame 13. The housing 30 has guide extensions 45, which engage in recesses 46 of the fastening frame 13 formed in the longitudinal direction. Specifically, the recesses 46 form two T grooves formed in the longitudinal direction, in which the guide extensions 45 engage so they are longitudinally displaceable. The guide extensions 45 are T-shaped and engage in the recesses 46 in such a way that the housing 30 is secured in the Z direction, in particular of the aircraft.

The housing 30 furthermore has a through drilled hole 47, which penetrates the housing 30 along the longitudinal axis L. A fixing element 17 of the securing device 14 is arranged so it is longitudinally displaceable in the through drilled hole 47 to secure the side guide device 11 at one of the different positions A, B, C, D. The fixing element 17 will be discussed in greater detail hereinafter.

Figure 2:
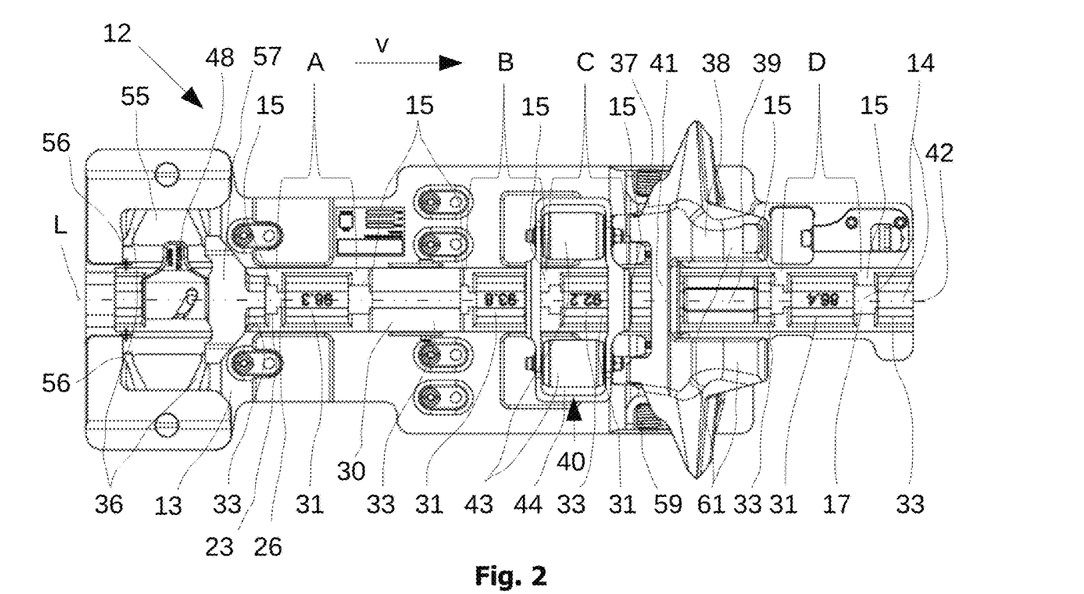
FIG. 2 shows a top view of a holding unit of the side guide according to FIG. 1, wherein the side guide device is concealed.
Figure 3:
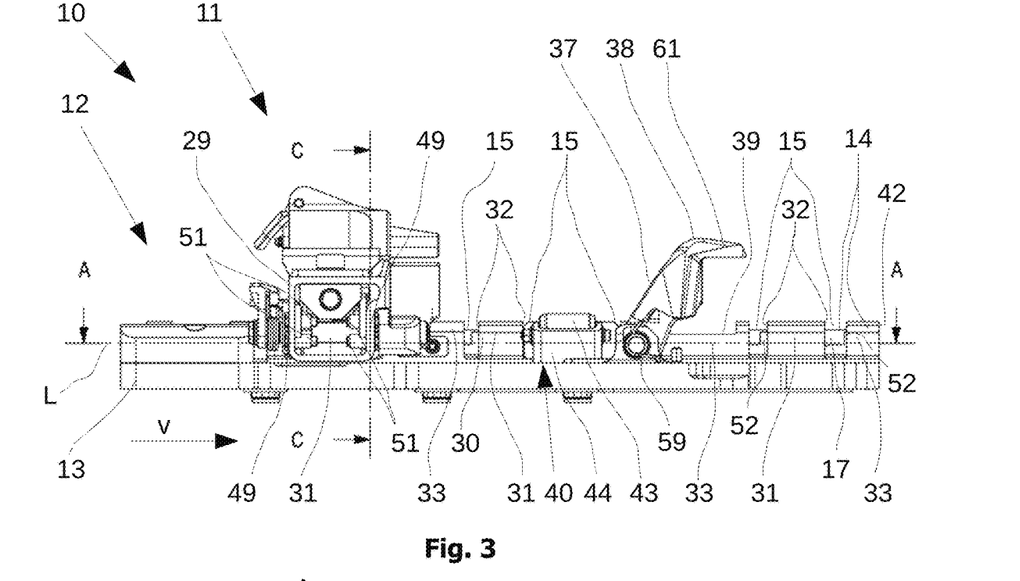
FIG. 3 shows a side view of the side guide according to FIG. 1.
Figure 4:
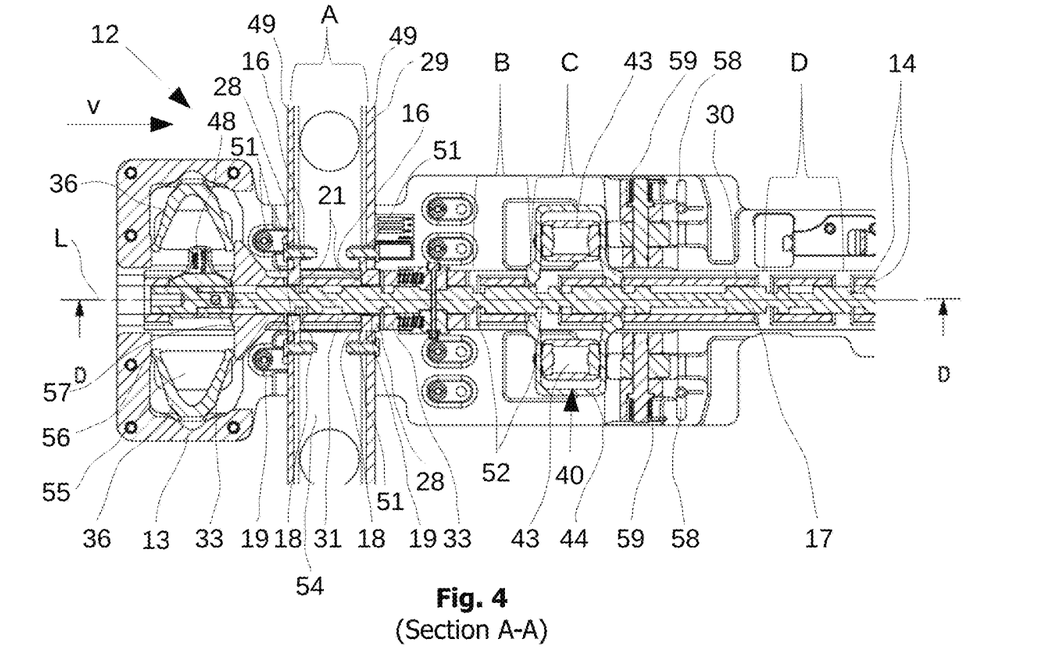
FIG. 4 shows a section through the side guide according to FIG. 1 along section line A-A shown in FIG. 3.

The housing 30 has multiple housing regions 31, 33, which are arranged in series along the longitudinal axis L. The through drilled hole 47 penetrates the housing regions 31, 33 completely. The housing 30 is integrally formed. Alternatively, the housing 30 can be assembled from multiple individual parts. Each two adjacent housing regions 31, 33 are spaced apart from one another along the longitudinal axis L. A recess 15, which extends through the longitudinal axis L, is formed between each two adjacent housing regions 31, 33. The recess 15 is formed on both sides on a first of the housing regions 31 in the longitudinal direction v in each case. As can be seen in FIGS. 2 to 4, the housing 30 comprises a total of four housing regions 31. The two recesses 15 which adjoin one of the first housing regions 31 form a recess pair, in which a rail element 29 of the side guide device 11 is insertable. One recess pair represents one of the different positions A, B, C, D in each case, at which the side guide device 11 can be secured. A total of seven recesses 17 are formed along the longitudinal axis L. Two first housing regions 31 adjoin one another at the two positions B, C. The two associated recess pairs therefore share a common recess 15.

In total, the side guide 10 according to FIGS. 1 to 8 has four positions A, B, C, D along the longitudinal axis L, at which the side guide device 11 can be secured. FIGS. 1, 3, 4, and 6 show by way of example the side guide device 11 at the first position A.

As mentioned above, the securing device 14 comprises a fixing element 17, which is arranged so it is displaceable along the longitudinal axis L in the housing 30. Specifically, the fixing element 17 is a fixing shaft, which is mounted so it is longitudinally movable in the through drilled hole 47 of the housing 30 to secure and release the side guide device 11. The fixing element 17 is referred to hereinafter as a fixing shaft having the same reference sign.

The displacement of the fixing shaft 17 is carried out in the exemplary embodiment shown by an actuating lever 48, which has a link guide. In the exemplary embodiment, a pin is fastened on the fixing shaft 17. This pin engages in the link guide of the actuating lever 48, which can in turn be rotated around the fixing shaft 17. Due to the rotation of the actuating lever 48, the pin is displaced in the longitudinal direction v of the fastening frame 13, in particular along the longitudinal axis L of the housing 30, because of which the fixing shaft 17 is displaced in a corresponding translational movement. The fixing shaft 17 can be brought into a fixing position and a release position by the actuating lever 48. In the fixing position, the fixing shaft 17 secures the side guide device 11 at one of the different positions A, B, C, D. In the release position, the side guide device 11 is removable from the corresponding recess pair and can be inserted and fixed if needed at another position A, B, C, D in a further recess pair.

To secure and release the rail element 29 of the inserted side guide device 11, the fixing shaft 17 has a fixing contour 23 and a release contour 26. The two contours 23, 26 adjoin one another in the longitudinal direction v. The fixing shaft 17 has a fixing contour 23 and a release contour 26 for each recess 15 of the housing 30. In other words, the fixing shaft 17 comprises a plurality of fixing and release contours 23, 26 to be able to fix the rail element 29 of the side guide device 11 at the positions A, B, C, D.

Figure 5:
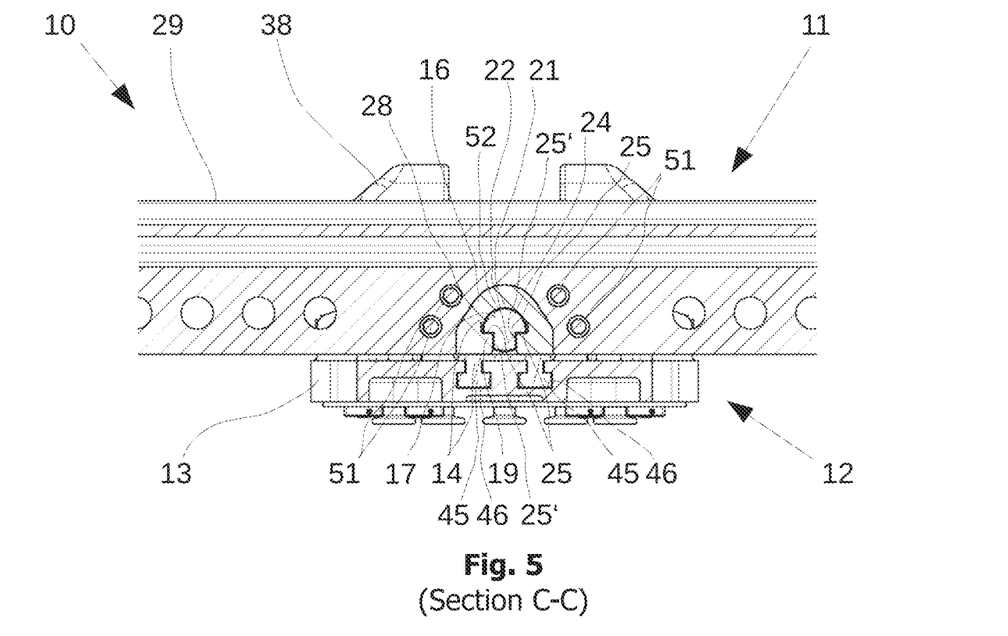
FIG. 5 shows a partial view of a section through the side guide according to FIG. 1 along section line C-C shown in FIG. 3.

As can be seen in section C-C shown in FIG. 5, the fixing contour 23 of the fixing shaft 17 has a cross-sectional profile deviating from a circular shape. FIG. 5 shows the fixing shaft 17 in the fixing position, in which the fixing shaft 17 engages in a formfitting manner with the fixing contour 23 in the side guide device 11 and locks it. Specifically, the fixing contour 23 of the fixing shaft 17 engages in a formfitting manner in the fixing position with a cross-sectional contour 22 of an opening 21 of the rail element 29.

To absorb and transmit high loads, the side guide device 11 according to FIGS. 1 to 8 has contact elements 16, which are inserted into the above-mentioned rail element 29. The contact elements 16 are each formed by a plate-shaped reinforcing insert 28. The reinforcing insert 28 is preferably a steel plate. According to this exemplary embodiment, two reinforcing inserts 28 are arranged opposite to one another in each case on longitudinal legs 49 of the rail element 49. The rail element 29 comprises an elongated polygonal profile, which preferably consists of aluminum. The rail element 29 has recesses on the longitudinal legs 49, in which the reinforcing inserts 28 are inserted. In addition, the reinforcing inserts 28 are fastened on the rail element 29 by multiple fasteners 51. The fasteners 51 are screws in the specific case. The screw connection between the respective reinforcing inserts 28 and the rail element 29 can be seen well in FIG. 4, for example.

The rail element 29 is shown in the inserted and secured state in FIGS. 1, 3, 4, and 6. By way of example, the rail element 29 is inserted at the position A in the associated recess pair and fixed by the fixing shaft 17 against lifting therein. In this fixing position, the fixing shaft 17 engages with the fixing contour 23 in the opening 21 of a formfitting section 19 of the respective reinforcing insert 28. In other words, each of the two opposing reinforcing inserts 28 has an opening 21, which is part of a formfitting section 19 of the respective reinforcing inserts 28. The openings 21 of the two opposing reinforcing inserts 28 are formed aligned. The respective opening 21 has a cross-sectional contour 22 deviating from a circular shape (see FIG. 5). The cross-sectional contour 22 of the opening 21 and the fixing contour 23 of the fixing shaft 17 are formed essentially mushroom-shaped. Specifically, the cross-sectional contour 22 of the opening 21 and the fixing contour 23 each have a circular contour section 24, which is adjoined by two linear contour sections 25 recumbent in relation to the longitudinal axis L. The two recumbent contour sections 25 each adjoin a linear contour section 25' which is upright in relation to the longitudinal axis L. The cross-sectional contour 22 of the opening 21 therefore comprises two steps, at which the fixing contour 23 of the fixing shaft can support itself or supports itself, due to the linear contour sections 25, 25'.

The contour sections of the cross-sectional contour 22 and the fixing contour 23 comprise surfaces which are in contact with one another for securing. A dimension difference between the cross-sectional contour 22 and the fixing contour 23 of up to 5% can be provided to ensure the longitudinal displaceability of the fixing shaft 17.

Figure 1:
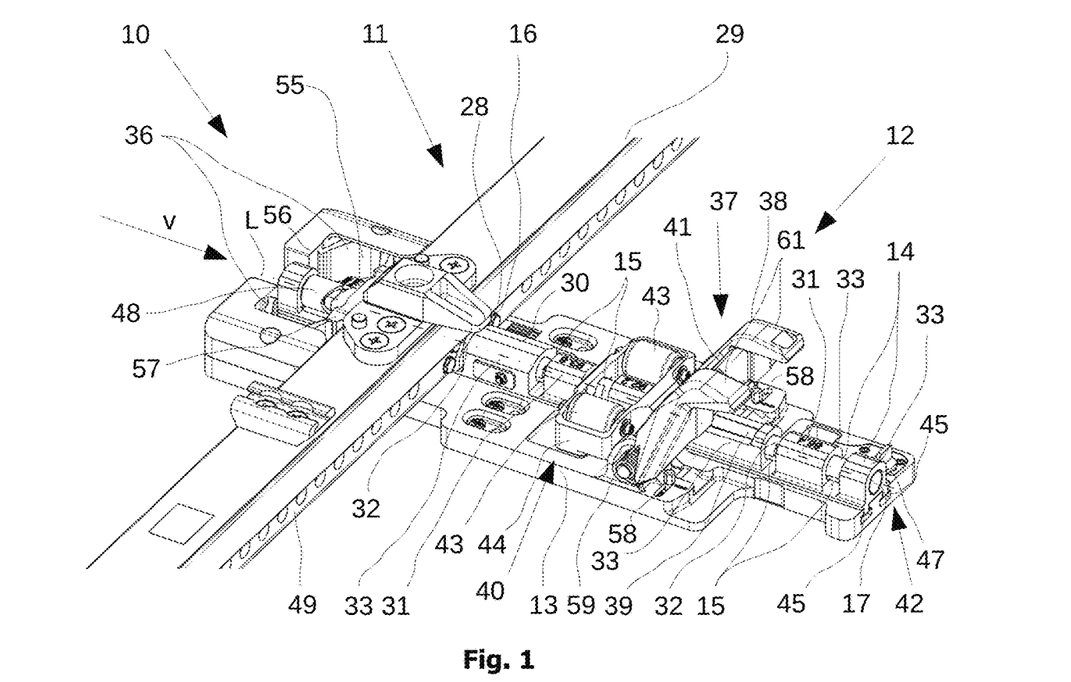
FIG. 1 shows a perspective view of a side guide having a holding unit and a side guide device according to one preferred exemplary embodiment according to the invention.

As can be seen in FIG. 1, the circular contour section 24 is formed partially cylindrical in the circumferential direction. The linear contour sections 25, 25' are flattenings 27. These are preferably produced by milling machining of the fixing shaft 17. The two upright flattenings 27 of the fixing shaft 17 delimit a web 52 orthogonal to the longitudinal axis L, which opens into the partially cylindrical part of the fixing contour 23. The web 52 has a width transverse to the longitudinal axis L which is less than an external diameter of the fixing shaft 17.

The web 52 merges into the release contour 26 adjoining the fixing contour 23. The web 52 is formed upright in relation to the longitudinal axis L in the region of the release contour 26 over the entire cross section. In other words, the mushroom-shaped fixing contour 23 adjoins the release contour 26, which is formed I shaped.

It can be seen well in FIG. 5 that the opening 21 of the reinforcing inserts 28 is formed open outward, specifically open downward. Two opposing flattenings, in particular the upright linear contour sections 25, 25', delimit a gap via which the rail element 29 can be placed on the fixing shaft 17 in the region of the release contour 26. The gap essentially has a width which corresponds to the width of the web 52. The rail element 29 can therefore be placed in the release position of the fixing shaft 17 on the release contour 26 and subsequently can be fixed by the translational movement of the fixing shaft 17 via the fixing contour 23 at the corresponding position. The securing and release of the rail element 29 takes place here according to the key/lock principle.

To insert the rail element 29 into one of the recess pairs, the fixing shaft 17 is in the release position. The rail element 29 is pushed with the openings 21 open downward in the reinforcing inserts 28 onto the release contour 26, in particular the web 52. In this state, the rail element 29 and thus the side guide device 11 is loosely inserted. If needed, it can be taken out of the recess pair in this state and offset to another of the positions.

To secure the rail element 29 against lifting, the fixing shaft 17 is displaced in the longitudinal direction v, so that the fixing contour 23 enters the opening 21 and forms a form fit with the cross-sectional contour 22 of the opening 21. The form fit is formed by the displacement of the fixing shaft 17 at both opposing reinforcing inserts 28 by a separate fixing contour 23 of the fixing shaft 17. In this state, the fixing shaft 17 is located in the fixed position. The rail element 29 and thus the side guide device 11 is secured and thus secured against lifting.

Figure 6:
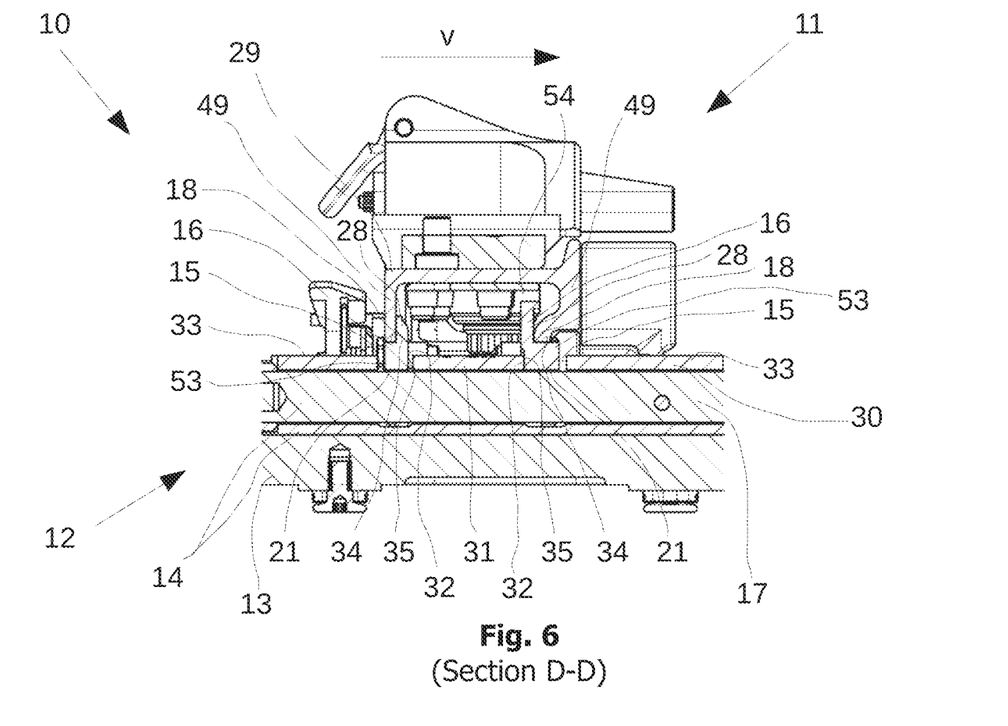
FIG. 6 shows a partial view of a section through the side guide according to FIG. 1 along section line D-D shown in FIG. 4.
Figure 7:
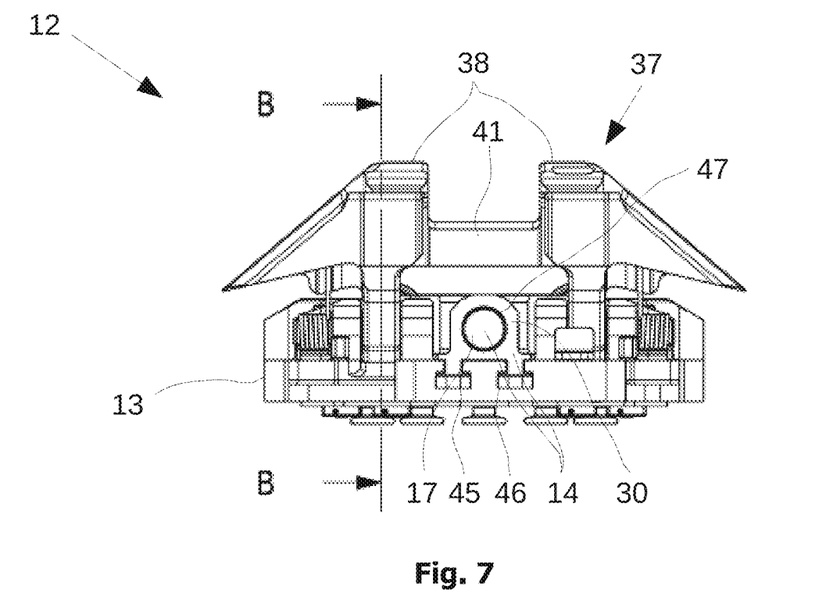
FIG. 7 shows a frontal view of the side guide according to FIG. 1.

Furthermore, it can be seen from FIGS. 5 and 6 that the formfitting section 19 is essentially triangular and comprises an extension 53, which is arranged in the wall of the longitudinal legs 49 of the rail element 29. The extension 53 is in contact with the wall of the longitudinal legs 49. The opening 21 completely penetrates the extension 53.

As shown in FIG. 6, the respective reinforcing insert 28 furthermore comprises a support section 18, which is arranged on an inner side. Specifically, the support section 18 is arranged integrated in the rail element 29. The support section 18 is arranged at the reinforcing insert 28 on a side facing toward a rail interior 54. The support section 18 forms the plate-shaped part of the reinforcing insert 28. The extension 53 of the formfitting section 19 extends starting from the support section 18.

The support section 18 is used to absorb transverse forces, which act transversely to the rail longitudinal direction on the rail element 29, and to introduce the absorbed transverse forces into the housing 30 of the securing device 14. The transmission of the forces from the rail element 29 to the housing 30 always takes place as pressure. I.e., independently of whether transverse forces occur as traction forces or compression forces at the rail element 29, they are absorbed as pressure by the reinforcing insert 28 and transmitted as pressure from the reinforcing insert 28 to the housing 30, specifically the first housing region 31.

The support section 18 of the respective reinforcing insert 28 has a step 34, which faces toward one of the longitudinal legs 49 of the rail element 29. The rail element 29 presses against the step 34. Specifically, the longitudinal leg 49 of the rail element 29 presses against a step wall and a step base, which jointly form the step 34. On a side opposite to the step 34, the support section 18 has a contact surface 35. The contact surface 35 is arranged facing toward the rail interior 54 and thus on the inside in relation to the rail element 29. The contact surface 35 is in contact with the first housing region 31 in case of load, in which corresponding transverse forces are absorbed and transmitted. The reinforcing insert 28 is pressed with the contact surface 35 against the first housing region 31. In other words, the contact surface 35 is in direct contact with the first housing region 31 in case of load. If no transverse loads occur, i.e., in the non-load case, the first housing region 31 can have a distance from one or both contact surfaces 35 of the reinforcing inserts 28.

As shown in FIG. 6 or also FIG. 4, the housing 30 protrudes with the first housing region 31 into the rail element 29. Specifically, the housing 30 engages with the first housing region 31 in the rail interior 54 of the rail element 29. The first housing region 31 has a stop 32 at both longitudinal ends, which is arranged opposite to the contact surface 35 of the respective reinforcing insert 28. In case of load, the contact surface 35 strikes against the respective opposing stop 32 of the first housing region 31 to transmit force. The second housing region 33 or the respective housing region 31, 33 opposite to the first housing region 31 in the longitudinal direction v is spaced apart in case of load and in case of non-load from the reinforcing insert 28 located in the recess 15. This prevents occurring transverse forces from being transmitted as traction from the reinforcing inserts 28 to the second housing regions 33 or to the housing regions 31, 33 opposite to the first housing region 31 and thus the force flow extending via the screw connections. This could result in failure of the screw connections. The above-described force transmission applies not only to the position A shown in FIG. 18, but also to each of the further different positions B, C, D.

According to FIGS. 1, 2, and 4, the holding unit 12 comprises two spring elements 36, which spring mount the securing device 14 in the longitudinal direction v. Alternatively, only one spring element 36 or multiple spring elements 36 could be provided for the spring mounting of the securing device 14.

The spring elements 36 are arranged opposite to one another at the longitudinal axis L on the fastening frame 13. The fastening frame 13 has a receptacle space 55 for each spring element 36, in which the respective spring element 36 is arranged. The respective spring element 36 is supported, on the one hand, on a buttress 56 of the fastening frame 13 and, on the other hand, is in contact with the housing 30, which is displaceable in the longitudinal direction. For this purpose, the housing 30 has winglike contact regions 57, via which the housing 30 is in contact in a longitudinally movable manner with the spring elements 36. The spring elements 36 are arranged at one longitudinal end of the fastening frame 13.

FIG. 4 shows that the spring elements 36 are V-shaped. The spring elements 36 are in contact with their ends with the buttress 56 and the winglike contact region 57 of the housing 30. At a vertex of the spring elements 36, they are mounted in a recess of the fastening frame 13, in particular around an upright axis of rotation. The actuating lever 48 is arranged along the longitudinal axis L at the axial position of the spring elements 36.

As can be seen well in FIGS. 1 and 3, one of the four positions for the side guide device 11 is provided at a longitudinal end 42 of the fastening frame 13. This is the position D in this case. A latch 37 having a latch claw 38 is arranged at the fastening frame 13 inside the position D. The latch 37 adjoins the inside recess 15 of the recess pair of the position D. The latch 37 is fastened so it is rotationally movable around an axis of rotation located transversely to the longitudinal direction v on the fastening frame 13. Two springs 59, in particular spiral springs, are arranged at the axis of rotation, which pre-tension the latch 37 so it is rotationally movable in a direction facing away from the position D (see FIG. 3). To hold the latch 37 and thus the latch claw 38 in a working position, jaws 58 displaceable transversely to the longitudinal direction v are arranged in the fastening frame 13, which are apparent in FIG. 8. The jaws 58 are movable between a blocking position and a release position transversely to the longitudinal axis L. In the blocking position, the jaws 58 are in contact with a lug of the latch 37. The jaws 58 form a stop for the latch 37 to block a rotational movement of the latch 37 around the axis of rotation by the pre-tensioned springs 59. In the working position, the latch 37 can execute its guiding and holding function with respect to a piece of cargo.

Figure 8:
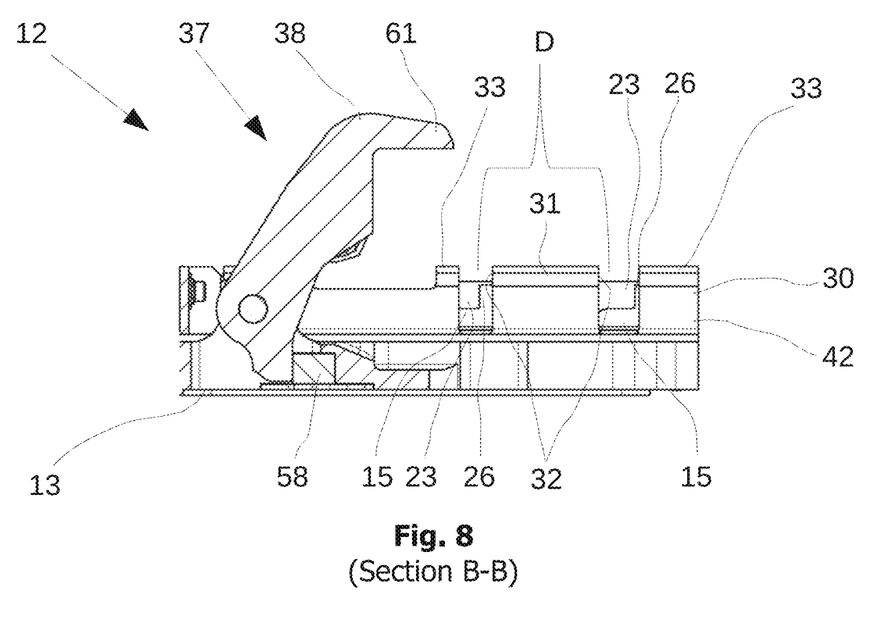
FIG. 8 shows a partial view of a section through the side guide according to FIG. 1 along section line B-B shown in FIG. 7.

If the jaws 58 are displaced into the release position, the springs 59 pivot the latch 37 into a retracted parked position. The jaws 58 have a further stop for the parked position, against which the latch 37 presses.

Furthermore, the latch 37 can be folded down around the axis of rotation toward the position D. This can be advantageous, for example, when driving over the latch 37. The latch 37 can thus assume a lowered resting position in addition to the parked position.

As can be seen in FIGS. 1 to 4, the latch claw 38 of the latch 37 is in two parts in sections. The latch claw 38 is forked. The latch claw 38 has two claw legs 61 extending in the longitudinal direction v, which are provided on both sides oatf the longitudinal axis L. The claw legs 61 are spaced apart from one another transversely to the longitudinal direction v. The claw legs 61 preferably have a distance of 5 cm to 15 cm (approximately 1.95 inches to 5.9 inches), in particular of 5 cm to 10 cm (approximately 1.95 inches to approximately 3.9 inches), preferably of 7 cm (approximately 2.75 inches) from one another. The claw legs 61 are connected to one another via a bridge element 41. The bridge element 41 extends transversely to the longitudinal axis L and connects the two claw legs 61. The latch claw 38 is integrally formed. The bridge element 41 extends over the securing device 14. To pivot the latch 37 into the lowered resting position, the fixing shaft 17 has a flattening in an upper region. The housing 30 is exposed in this region, so that the bridge element 41 can be accommodated in the lowered state of the latch 37.

It is shown in FIGS. 1 to 4 that the side guide 10 has a guide unit 40 having two guide rollers 43 and a roller housing 44. The guide rollers 43 are arranged in a rotationally movable manner in the roller housing 44. The guide rollers 43 are roller shaped. The roller housing 44 forms a frame, which is inserted at the position C in the associated recess pair and fixed by the fixing shaft 17 in the present exemplary embodiment. The frame has an opening for this purpose at the point of each recess 15, which corresponds to the opening 21 of the reinforcing insert 28. Reference is made to the above description of the opening 21 with respect to the design of the openings of the frame. The guide unit 40 is arranged adjoining the latch 37. It is possible to insert the guide unit 40 into a recess pair at each of the different positions A, B, C, D and secure it by way of the fixing shaft 17, like the rail element 29.

Figure 9:
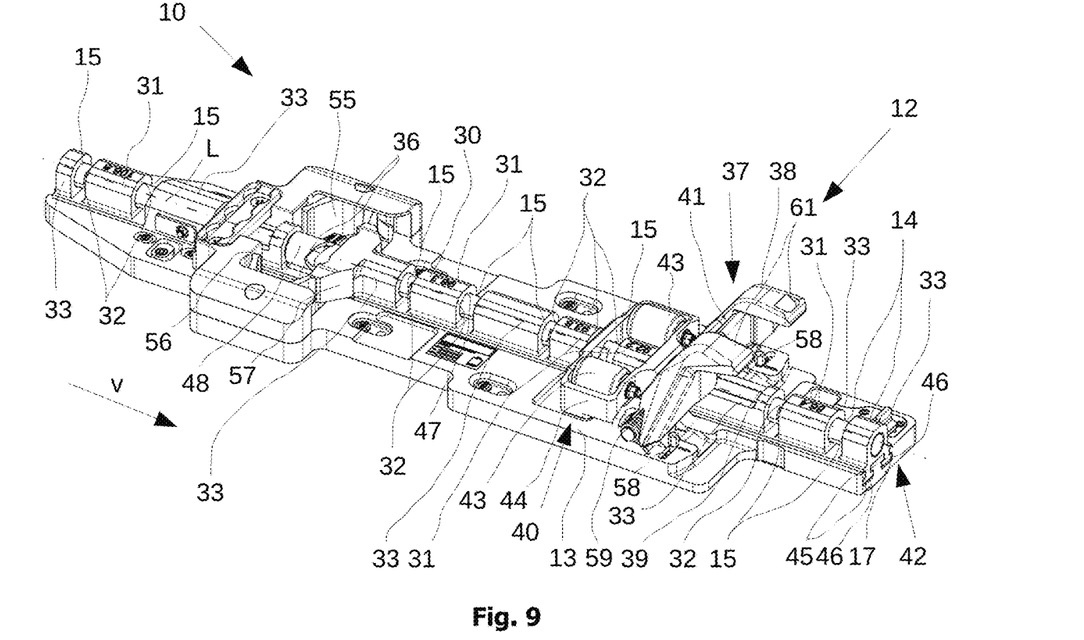
FIG. 9 shows a perspective view of a side guide according to a further exemplary embodiment according to the invention, wherein the side guide device is concealed.
Figure 10:
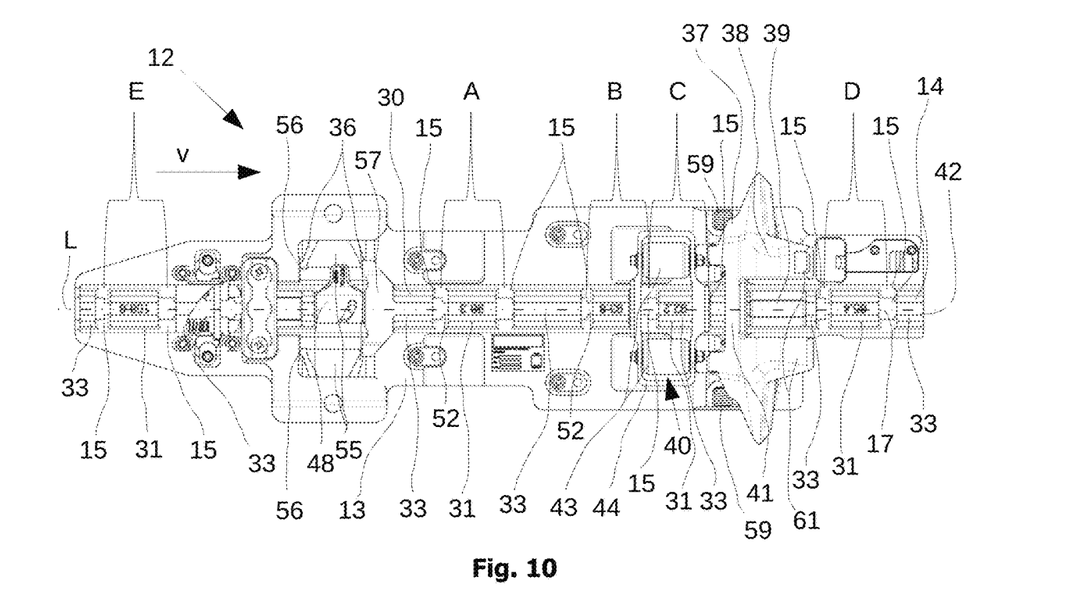
FIG. 10 shows a top view of the side guide according to FIG. 9.
Figure 11:
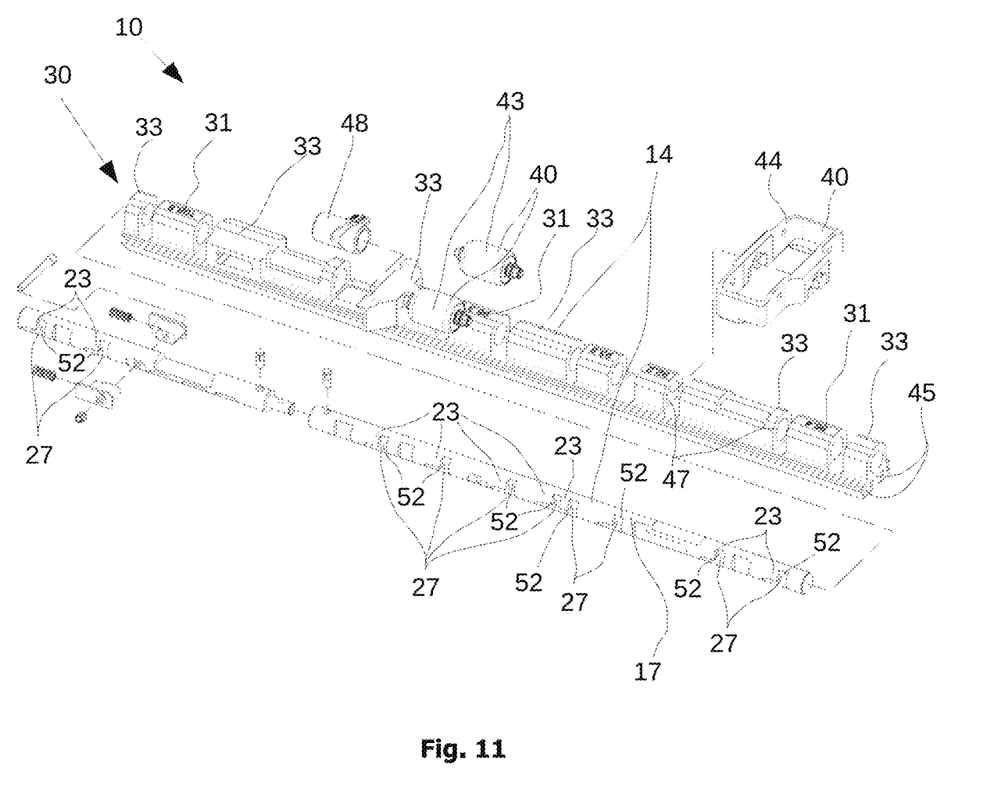
FIG. 11 shows an exploded illustration of a securing device and a guide roller unit of the side guide according to FIG. 9.

FIGS. 9 to 11 show a holding unit 12 of a side guide 10 according to a further exemplary embodiment according to the invention. In contrast to the side guide 10 according to FIGS. 1 to 8, in the side guide 10 according to FIGS. 9 to 11, the holding unit 12 has an extended fastening frame 13 to enable a further position on the securing device 14 for the side guide device 11 (not shown). In total, the side guide 10 according to FIGS. 9 to 11 has five positions A, B, C, D, E along the longitudinal axis L, at which the side guide device 11 can be secured. The further position E is provided at a second longitudinal end of the fastening frame 13. For this purpose, the securing device 14 has a further recess pair for accommodating the rail element 29. The fixing shaft 17 additionally has two fixing contours 23 and two release contours 26 at the axial points of the additional recesses 15. Reference is made to the above description of the side guide 10 according to FIGS. 1 to 8 with respect to the design, arrangement, and interaction of the components shown in FIGS. 9 to 11.

A further difference in relation to the side guide 10 according to FIGS. 1 to 8 in this exemplary embodiment is in the position of the spring elements 36. These are arranged between the position E and the position A along the longitudinal axis L. The exploded illustration shown in FIG. 11 illustrates by way of example, for the side guide 10 according to FIGS. 1 to 8 and the side guide 10 according to FIGS. 9 to 11, the design of the housing 30 and the fixing shaft 17, in particular with respect to the fixing and release contours.

In general, the side guide device 11, the side guides 10 according to both above-described exemplary embodiments, comprises latches arranged at the rail element 29 for holding and/or guiding pieces of cargo. Such latches can be so-called X latches and/or Z latches (see, for example, FIG. 1 or 3) and/or Y latches, which accordingly securely guide and fix the pieces of cargo.

It is to be noted at this point that, particularly with reference to the details illustrated in the drawings, features described in the context of separate embodiments can also be implemented in combination in a single embodiment. Conversely, various features that are described in the context of a single embodiment can also be implemented in multiple embodiments separately or in any suitable subcombination.

LIST OF REFERENCE SIGNS 10 side guide
11 side guide device
12 holding unit
13 fastening frame
14 securing device
15 recesses
16 contact element
17 fixing element, fixing shaft
18 inside support section
19 formfitting section
21 opening
22 cross-sectional contour
23 fixing contour
24 circular contour section
25, 25' linear contour section
26 release contour
27 flattening
28 plate-shaped reinforcing insert
29 rail element
30 housing
31 first housing region
32 stop
33 second housing region
34 step
35 inside contact surface
36 spring element
37 latch
38 two-part latch claw
39 flattened region
40 guide unit
41 bridge element
42 longitudinal end
43 guide roller
44 roller housing
45 guide extensions
46 recesses
47 through drilled hole
48 actuating lever
49 longitudinal leg of the rail element
51 fastener
52 orthogonal web
53 extension of the formfitting section
54 rail interior
55 receptacle space
56 buttress
57 wing-like contact regions
58 jaws
59 springs
61 claw legs
A first position
B second position
C third position
D fourth position
E fifth position
v longitudinal direction
L longitudinal axis

The invention claimed is:

1. A side guide for guiding and/or fastening cargo items in an aircraft, the side guide comprising:
at least one side guide device; and
at least one holding unit for the side guide device, wherein the holding unit comprises a fastening frame extending in a longitudinal direction and at least one securing device arranged on the fastening frame, which has a plurality of recesses extending transversely to the longitudinal direction,
wherein the side guide device is insertable at different positions into at least one of the recesses and can be secured in the inserted state at the different positions by the securing device, wherein the side guide device has at least one contact element coupled to a rail element, which, in the inserted state, can be engaged or is engaged with at least one fixing element, displaceable in the longitudinal direction, of the securing device, wherein the at least one contact element has at least one formfitting section having at least one opening having a cross-sectional contour deviating from a circular shape for the engagement of the fixing element, wherein the fixing element has at least one fixing contour, wherein the cross-sectional contour of the at least one opening and the at least one fixing contour of the fixing element are mushroom-shaped, and wherein the cross-sectional contour of the opening has two linear contour sections recumbent in relation to the longitudinal direction, each of which adjoin a linear contour section which is upright in relation to the longitudinal direction so that two steps are formed on which the fixing contour of the fixing element can support itself or supports itself.

2. The side guide according to claim 1, wherein the at least one fixing contour of the fixing element engages in a formfitting manner in a fixing position in the cross-sectional contour of the opening to secure the side guide device.

3. The side guide according to claim 2, wherein the fixing contour of the fixing element and/or the cross-sectional contour of the opening has/have at least one at least partially circular contour section and at least one linear contour section.

4. The side guide according to claim 3, wherein the fixing element has at least one release contour having at least one flattening, which adjoins the fixing contour in the longitudinal direction and is formed in such a way that the side guide device is insertable into at least one of the recesses or removable therefrom in a release position of the fixing element.

5. The side guide according to claim 1, wherein the contact element is formed by a plate-shaped reinforcing insert which is firmly connected to the rail element of the side guide device.

6. The side guide according to claim 1, wherein the at least one contact element has at least one inside support section for the securing device for introducing occurring forces, and wherein the securing device engages with at least one first housing region in the inserted state of the side guide device, wherein the first housing region comprises at least one stop in the longitudinal direction for the at least one inside support section of the contact element to receive occurring forces from the rail element.

7. The side guide according to claim 6, wherein the securing device has at least one second housing region, which is spaced apart from the contact element in the inserted state of the side guide device and, with the first housing region, delimits at least one of the recesses at at least one of the different positions.

8. The side guide according to claim 6, wherein the support section comprises at least one step, with which the rail element of the side guide device is in contact, to transmit the occurring forces, in particular traction and compression forces, in the longitudinal direction of the fastening frame to the securing device.

9. The side guide according to claim 6, wherein the support section has at least one inside contact surface, which faces toward the first housing region for contact.

10. The side guide according to claim 1, wherein the securing device is arranged displaceably in the longitudinal direction in the fastening frame.

11. The side guide according to claim 1, further comprising at least one spring element, which is arranged in a supporting manner on the fastening frame and spring mounts the securing device in the longitudinal direction.

12. The side guide according to claim 1, further comprising at least one latch having a two-part latch claw at least in sections, which is fastened on the fastening frame in such a way that the two-part latch claw is pivotable from an upright working position into a lowered resting position.

13. The side guide according to claim 12, wherein the fixing element has a region flattened in the longitudinal direction for accommodating a bridge element, extending transversely to the longitudinal direction, of the two-part latch claw.

14. The side guide according to claim 12, wherein the securing device has at least two of the recesses at one longitudinal end of the fastening frame, wherein the latch having the two-part latch claw adjoins inside.

15. The side guide according to claim 1, wherein the securing device comprises at least three pairs of the recesses so that the side guide device can be secured at at least three different positions.

16. The side guide according to claim 1, wherein at least one guide roller is mounted so it is rotationally movable in a roller housing, which is insertable or inserted at different positions into at least one of the recesses.

17. A cargo deck of an aircraft having at least one side guide according to claim 1, wherein the side guide has a plurality of holding units, at which the side guide device is secured or can be secured.

* * * * *